US012666254B2

(12) United States Patent
Kim et al.

(10) Patent No.: US 12,666,254 B2
(45) Date of Patent: Jun. 23, 2026

(54) SECURITY PROTECTION OF USER EQUIPMENT (UE)-TO-UE RELAY DISCOVERY

(71) Applicant: QUALCOMM Incorporated, San Diego, CA (US)

(72) Inventors: Hongil Kim, San Diego, CA (US); Soo Bum Lee, San Diego, CA (US); Karthika Paladugu, Hyderabad (IN); Hong Cheng, Basking Ridge, NJ (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 638 days.

(21) Appl. No.: 18/185,017

(22) Filed: Mar. 16, 2023

(65) Prior Publication Data

US 2023/0319551 A1      Oct. 5, 2023

Related U.S. Application Data

(60) Provisional application No. 63/362,510, filed on Apr. 5, 2022.

(51) Int. Cl.
*H04W 12/03*      (2021.01)
*H04W 8/00*      (2009.01)
(52) U.S. Cl.
CPC ........... *H04W 12/03* (2021.01); *H04W 8/005* (2013.01)
(58) Field of Classification Search
None
See application file for complete search history.

(56) References Cited

U.S. PATENT DOCUMENTS

2018/0198767 A1*   7/2018   Choi ..................... H04W 12/08
2019/0246353 A1*   8/2019   Jensen ................... H04L 67/12

OTHER PUBLICATIONS

"3rd Generation Partnership Project, Technical Specification Group Services and System Aspects, Study on Security Aspects of Enhancement for Proximity Based Services in the 5G System (5GS) (Release 17)", 3GPP Standard, Technical Report, 3GPP TR 33.847, 3rd Generation Partnership Project, Mobile Competence Centre, 650, Route Des Lucioles, F-06921 Sophia-Antipolis Cedex, France, No. V0.2.0 Oct. 26, 2020, XP051961562, pp. 1-45, Abstract p. 35, Paragraph Section 6.6-p. 38.
International Search Report and Written Opinion—PCT/US2023/015478—ISA/EPO—Jun. 13, 2023.

* cited by examiner

*Primary Examiner* — Frantz Bataille
(74) *Attorney, Agent, or Firm* — Harrity & Harrity LLP

(57)      ABSTRACT

Various aspects of the present disclosure generally relate to wireless communication. In some aspects, a user equipment (UE) may encrypt a discovery message associated with a relay service based at least in part on a set of code-sending security parameters (CSSPs) associated with the relay service. The UE may transmit the encrypted discovery message. In some aspects, a UE may receive an encrypted discovery message. The UE may decrypt the encrypted discovery message based at least in part on a set of code-receiving security parameters (CRSPs) associated with the relay service. Numerous other aspects are provided.

30 Claims, 9 Drawing Sheets

Encrypt a discovery message associated with a relay service based at least in part on a set of code-sending security parameters (CSSPs) associated with the relay service

510

Transmit the encrypted discovery message

520

500

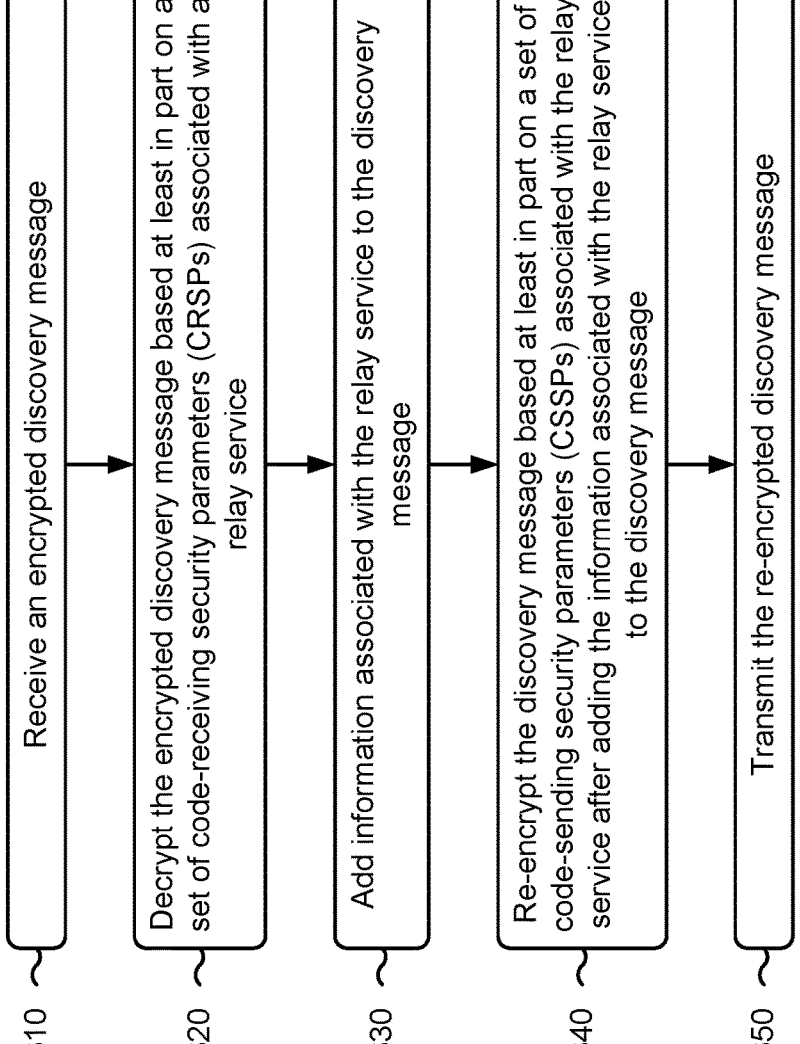

600

610 Receive an encrypted discovery message

620 Decrypt the encrypted discovery message based at least in part on a set of code-receiving security parameters (CRSPs) associated with a relay service 630 Add information associated with the relay service to the discovery message 640 Re-encrypt the discovery message based at least in part on a set of code-sending security parameters (CSSPs) associated with the relay service after adding the information associated with the relay service to the discovery message 650 Transmit the re-encrypted discovery message

FIGURE 6

Receive an encrypted discovery message

Decrypt the encrypted discovery message based at least in part on a set of code-receiving security parameters (CRSPs) associated with a relay service

710

720

700

SECURITY PROTECTION OF USER EQUIPMENT (UE)-TO-UE RELAY DISCOVERY

CROSS-REFERENCE TO RELATED APPLICATION

This patent application claims priority to U.S. Provisional Patent Application No. 63/362,510, filed on Apr. 5, 2022, entitled "SECURITY PROTECTION OF USER EQUIP-MENT (UE)-TO-UE RELAY DISCOVERY," and assigned to the assignee hereof. The disclosure of the prior application is considered part of and is incorporated by reference into this patent application.

FIELD OF THE DISCLOSURE

Aspects of the present disclosure generally relate to wireless communication and specifically, to techniques and apparatuses for security protection of UE-to-UE relay discovery.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A discovery message used in association with performing route discovery for UE-to-UE relaying is transmitted over-the-air. However, the discovery message does not have security protection. Therefore, an attacker that receives the discovery message over-the-air could, for example, obtain private information from the discovery message, spoof the discovery message to enable unauthorized use of a discovery service or degrade performance of a discovery service, or replay the discovery message to deceive other UEs.

SUMMARY

Some aspects described herein relate to a method of wireless communication performed by a UE. The method may include encrypting a discovery message associated with a relay service based at least in part on a set of code-sending security parameters (CSSPs) associated with the relay service. The method may include transmitting the encrypted discovery message.

Some aspects described herein relate to a method of wireless communication performed by a UE. The method may include receiving an encrypted discovery message. The method may include decrypting the encrypted discovery message based at least in part on a set of code-receiving security parameters (CRSPs) associated with a relay service. The method may include adding information associated with the relay service to the discovery message. The method may include re-encrypting the discovery message based at least in part on a set of CSSPs associated with the relay service after adding the information associated with the relay service to the discovery message. The method may include transmitting the re-encrypted discovery message.

Some aspects described herein relate to a method of wireless communication performed by a UE. The method may include receiving an encrypted discovery message. The method may include decrypting the encrypted discovery message based at least in part on a set of CRSPs associated with a relay service.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to encrypt a discovery message associated with a relay service based at least in part on a set of CSSPs associated with the relay service. The processor-readable code, when executed by the at least one processor, may be configured to cause the UE to transmit the encrypted discovery message.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to receive an encrypted discovery message. The processor-readable code, when executed by the at least one processor, may be configured to cause the UE to decrypt the encrypted discovery message based at least in part on a set of CRSPs associated with a relay service. The processor-readable code, when executed by the at least one processor, may be configured to cause the UE to add information associated with the relay service to the discovery message. The processor-readable code, when executed by the at least one processor, may be configured to cause the UE to re-encrypt the discovery message based at least in part on a set of CSSPs associated with the relay service after adding the information associated with the relay service to the discovery message. The processor-readable code, when executed by the at least one processor, may be configured to cause the UE to transmit the re-encrypted discovery message.

Some aspects described herein relate to a UE for wireless communication. The UE may include at least one processor and at least one memory, communicatively coupled with the at least one processor, that stores processor-readable code. The processor-readable code, when executed by the at least one processor, may be configured to cause the UE to receive an encrypted discovery message. The processor-readable code, when executed by the at least one processor, may be configured to cause the UE to decrypt the encrypted discovery message based at least in part on a set of CRSPs associated with a relay service.

Some aspects described herein relate to a non-transitory computer-readable medium that stores a set of instructions for wireless communication by a UE. The set of instructions, when executed by one or more processors of the UE, may cause the UE to encrypt a discovery message associated with a relay service based at least in part on a set of CSSPs associated with the relay service. The set of instructions, when executed by one or more processors of the UE, may cause the UE to transmit the encrypted discovery message.

Some aspects described herein relate to a non-transitory computer-readable medium that stores a set of instructions for wireless communication by a one or more instructions that, when executed by one or more processors of a UE, may cause the UE to receive an encrypted discovery message. The set of instructions, when executed by one or more processors of the UE, may cause the UE to decrypt the encrypted discovery message based at least in part on a set of CRSPs associated with a relay service. The set of instructions, when executed by one or more processors of the UE may cause the UE to add information associated with the relay service to the discovery message. The set of instructions, when executed by one or more processors of the UE, may cause the UE to re-encrypt the discovery message based at least in part on a set of CSSPs associated with the relay service after adding the information associated with the relay service to the discovery message. The set of instructions, when executed by one or more processors of the UE, may cause the UE to transmit the re-encrypted discovery message.

Some aspects described herein relate to a non-transitory computer-readable medium that stores a set of instructions for wireless communication by a one or more instructions that, when executed by one or more processors of a UE, may cause the UE to receive an encrypted discovery message. The set of instructions, when executed by one or more processors of the UE, may cause the UE to decrypt the encrypted discovery message based at least in part on a set of CRSPs associated with a relay service.

Some aspects described herein relate to an apparatus for wireless communication. The apparatus may include means for encrypting a discovery message associated with a relay service based at least in part on a set of CSSPs associated with the relay service. The apparatus may include means for transmitting the encrypted discovery message.

Some aspects described herein relate to an apparatus for wireless communication. The apparatus may include means for receiving an encrypted discovery message. The apparatus may include means for decrypting the encrypted discovery message based at least in part on a set of CRSPs associated with a relay service. The apparatus may include means for adding information associated with the relay service to the discovery message. The apparatus may include means for re-encrypting the discovery message based at least in part on a set of CSSPs associated with the relay service after adding the information associated with the relay service to the discovery message. The apparatus may include means for transmitting the re-encrypted discovery message.

Some aspects described herein relate to an apparatus for wireless communication. The apparatus may include means for receiving an encrypted discovery message. The apparatus may include means for decrypting the encrypted discovery message based at least in part on a set of CRSPs associated with a relay service.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIGS. 5-7 are flowcharts illustrating example processes performed, for example, by a UE in accordance with the present disclosure.

DETAILED DESCRIPTION

Figure 1:
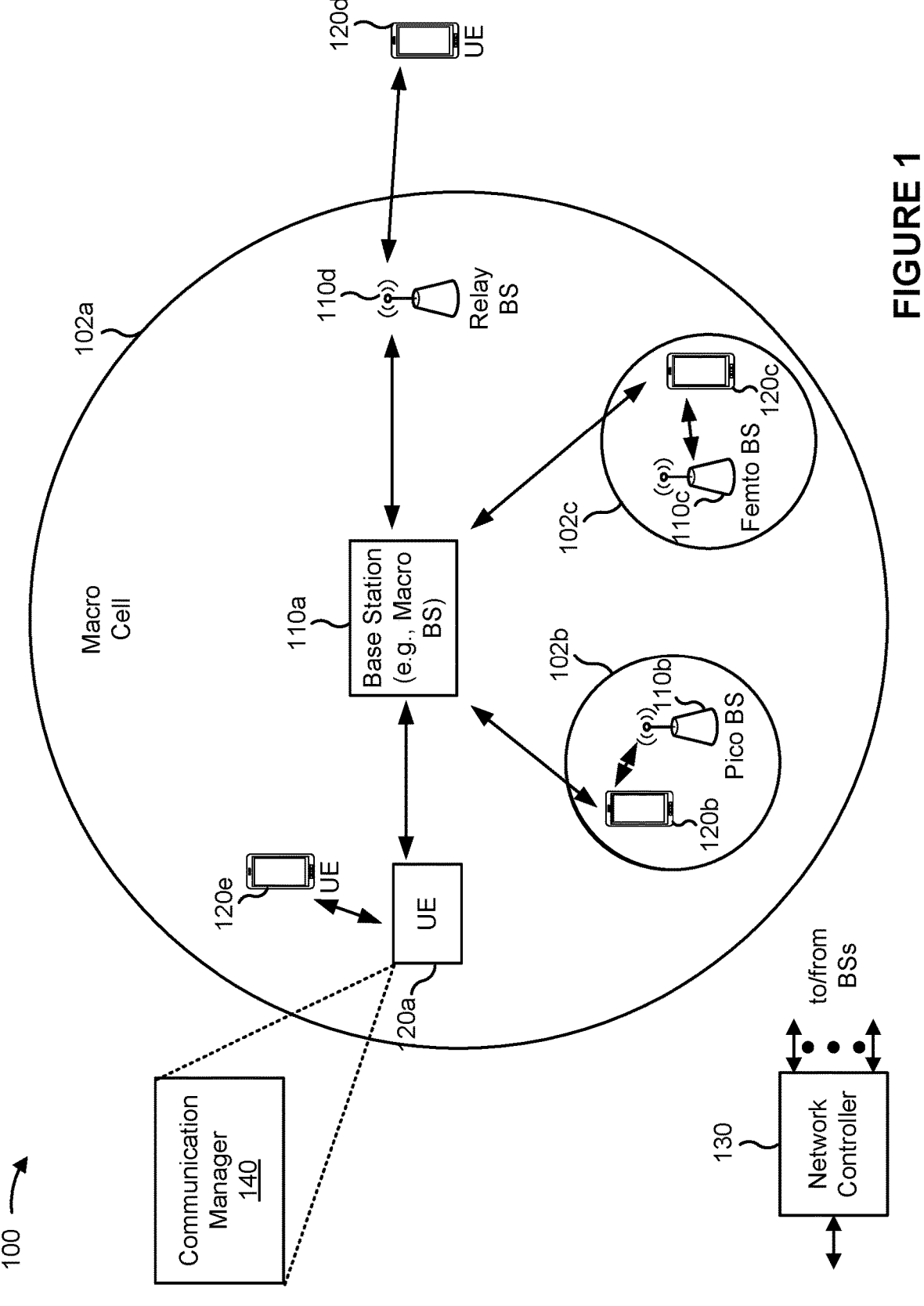
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to techniques and apparatuses for security protection of user equipment (UE)-to-UE relay discovery. Some aspects more specifically relate to security protection for discovery messages associated with a route discovery procedure. In some aspects, a discovery message may be protected using a set of code-sending security parameters (CSSPs) and a set of code-receiving security parameters (CRSPs) associated with a discovery service. Additionally, in some aspects, an end-to-end proximity services (ProSe) direct discovery information element (IE) included in the discovery message may be further protected using a set of CSSPs and a set of CRSPs associated with end-to-end ProSe direct discovery.

Particular aspects of the subject matter described in this disclosure can be implemented to realize one or more of the following potential advantages. In some examples, the described techniques can be used to improve security for route discovery associated with UE-to-UE relaying. For example, the techniques and apparatuses described herein may prevent an attacker from obtaining private information from a discovery message, spoofing a discovery message, or replaying the discovery message for the purpose of deceiving other UEs. In this way, security and performance associated with route discovery for UE-to-UE relaying can be improved, thereby improving overall performance and security for UE-to-UE relaying.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more base stations 110 (shown as a BS 110a, a BS 110b, a BS 110c, and a BS 110d), a UE 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (for example, in 4G), a gNB (for example, in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (for example, 5 to 40 watts) whereas pico base stations, femto base stations, and relay base stations may have lower transmit power levels (for example, 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (for example, three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some examples, a cell may not necessarily be stationary, and the geographic area of the cell may move in accordance with the location of a base station 110 that is mobile (for example, a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (for example, a base station 110 or a UE 120) and send a transmission of the data to a downstream station (for example, a UE 120 or a base station 110). A relay station may be a UE 120 that can relay transmissions for other UEs 120. In the example shown in FIG. 1, the BS 110d (for example, a relay base station) may communicate with the BS 110a (for example, a macro base station) and the UE 120d in order to facilitate communication between the BS 110*a* and the UE 120*d*. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may encrypt a discovery message associated with a relay service based at least in part on a set of code-sending security parameters (CSSPs) associated with the relay service; and transmit the encrypted discovery message. Additionally or alternatively, as described in more detail elsewhere herein, the communication manager 140 may receive an encrypted discovery message; decrypt the encrypted discovery message based at least in part on a set of code-receiving security parameters (CRSPs) associated with a relay service; add information associated with the relay service to the discovery message; re-encrypt the discovery message based at least in part on a set of CSSPs associated with the relay service after adding the information associated with the relay service to the discovery message; and transmit the re-encrypted discovery message. Additionally or alternatively, as described in more detail elsewhere herein, the communication manager 140 may receive an encrypted discovery message; and decrypt the encrypted discovery message based at least in part on a set of CRSPs associated with a relay service. Additionally or alternatively, the communication manager 140 may perform one or more other operations described herein.

Figure 2:
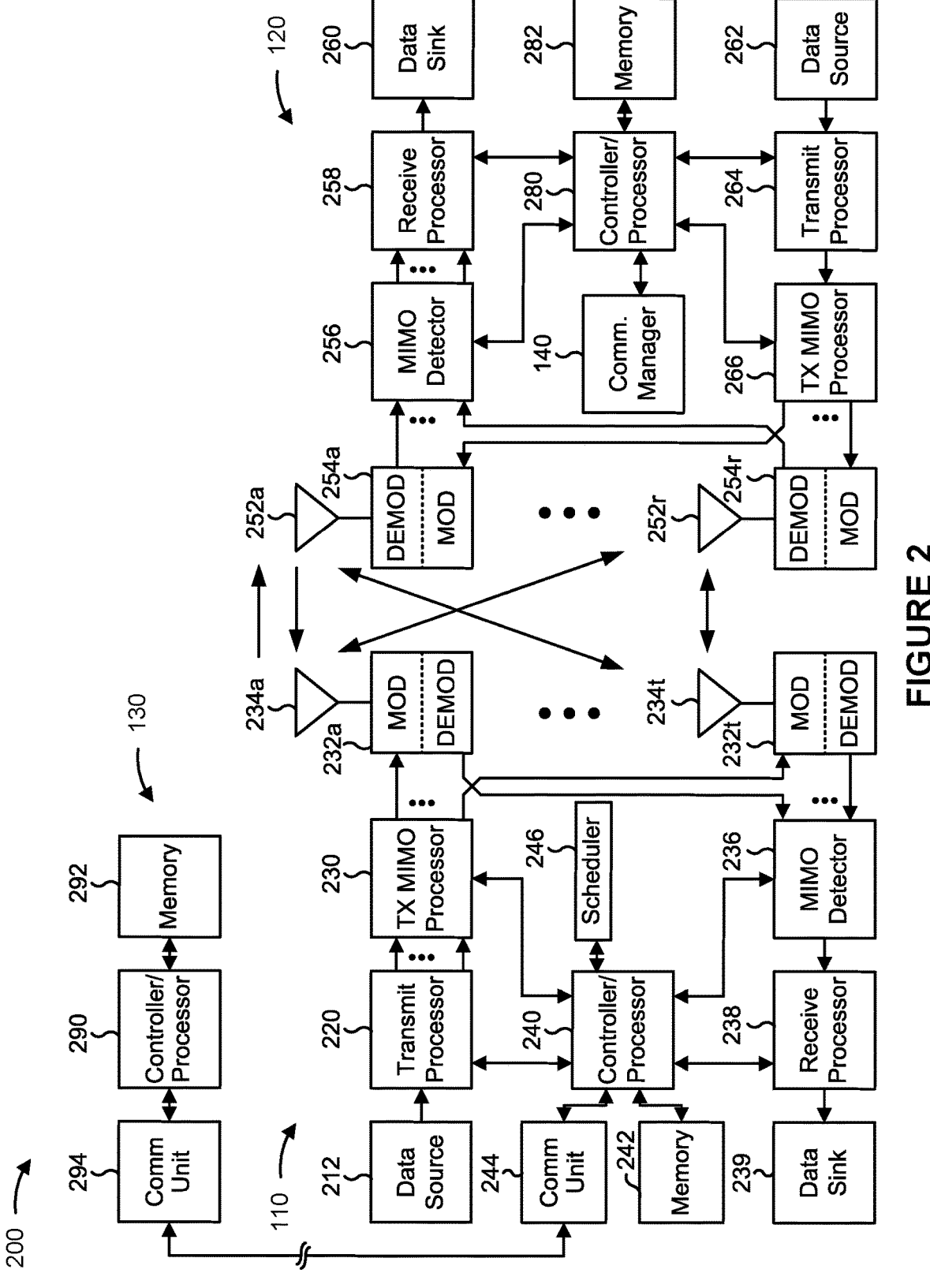
FIG. 2 is a diagram illustrating an example base station in communication with a user equipment (UE) in a wireless network in accordance with the present disclosure.

FIG. 2 is a diagram illustrating an example base station in communication with a UE in a wireless network in accordance with the present disclosure. The base station may correspond to the base station 110 of FIG. 1. Similarly, the UE may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (for example, encode and modulate) the data for the UE 120 based at least in part on the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the base station 110 or other base stations 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the base station 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the base station 110, the controller/processor 280 of the UE 120, or any other component(s) of FIG. 2 may perform one or more techniques associated with security protection of UE-to-UE relay discovery, as described in more detail elsewhere herein. For example, the controller/processor 240 of the base station 110, the controller/processor 280 of the UE 120, or any other component(s) of FIG. 2 may perform or direct operations of, for example, process 500 of FIG. 5, process 600 of FIG. 6, process 700 of FIG. 7, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the base station 110 or the UE 120, may cause the one or more processors, the UE 120, or the base station 110 to perform or direct operations of, for example, process 500 of FIG. 5, process 600 of FIG. 6, process 700 of FIG. 7, or other processes as described herein. In some examples, executing instructions may include running the instructions, converting the instructions, compiling the instructions, or interpreting the instructions, among other examples.

In some aspects, the UE (for example, the UE 120) includes means for encrypting a discovery message associated with a relay service based at least in part on a set of code-sending security parameters (CSSPs) associated with the relay service; or means for transmitting the encrypted discovery message. In some aspects, the UE includes means for receiving an encrypted discovery message; means for decrypting the encrypted discovery message based at least in part on a set of code-receiving security parameters (CRSPs) associated with a relay service; means for adding information associated with the relay service to the discovery message; means for re-encrypting the discovery message based at least in part on a set of CSSPs associated with the relay service after adding the information associated with the relay service to the discovery message; or means for transmitting the re-encrypted discovery message. In some aspects, the UE includes means for receiving an encrypted discovery message; or means for decrypting the encrypted discovery message based at least in part on a set of CRSPs associated with a relay service. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

Figure 3:
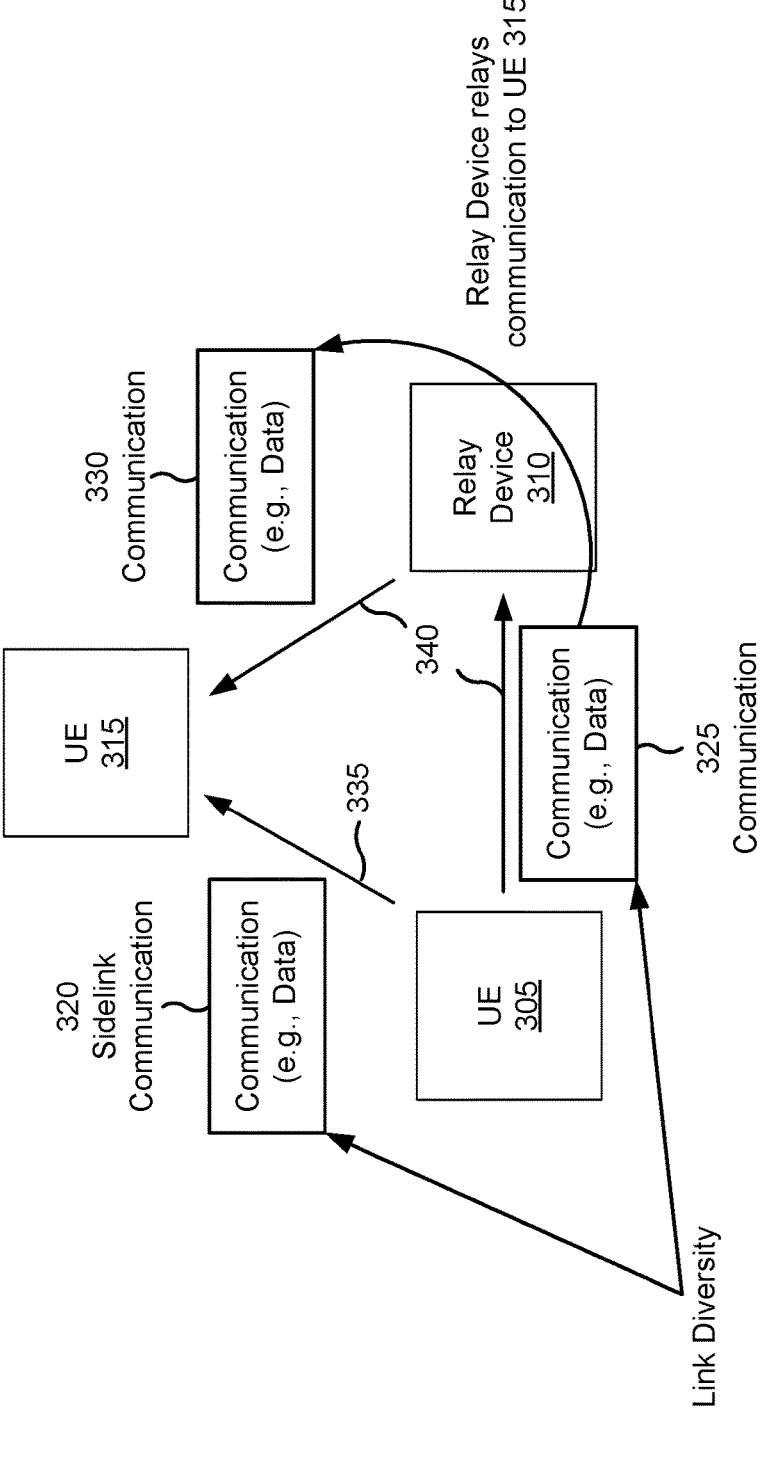
FIG. 3 is a diagram illustrating an example of a relay device that relays communications between a first UE and a second UE, in accordance with the present disclosure.

FIG. 3 is a diagram illustrating an example 300 of a relay device that relays communications between a first UE and a second UE, in accordance with the present disclosure. As shown, example 300 includes a UE 305, a relay device 310, and a UE 315. In example 300, the UE 305 is a Tx UE (sometimes referred to as a source UE (S-UE)), the relay device 310 is a relay UE (R-UE), and the UE 315 is an Rx UE (sometimes referred to as a destination UE (D-UE)). In some aspects, the UE 305 is a first UE 120, the relay device 310 is a second UE 120, and the UE 315 is a third UE 120.

As shown in FIG. 3, the UE 305 may transmit a communication (for example, data or control information) directly to the UE 315 as a sidelink communication 320. Additionally or alternatively, the UE 305 may transmit a communication (for example, data or control information) indirectly to the UE 315 via the relay device 310. For example, the UE 305 may transmit the communication to the relay device 310 as a communication 325, and the relay device 310 may relay (for example, forward or transmit) the communication to the UE 315 as a communication 330.

In some aspects, the UE 305 may communicate directly with the UE 315 via a sidelink 335. For example, the sidelink communication 320 may be transmitted via the sidelink 335. A communication transmitted via the sidelink 335 between the UE 305 and the UE 315 (for example, in the sidelink communication 320) does not pass through and is not relayed by the relay device 310. In some aspects, the UE 305 may communicate indirectly with the UE 315 via an indirect link 340. For example, the communication 325 and the communication 330 may be transmitted via different segments of the indirect link 340. A communication transmitted via the indirect link 340 between the UE 305 and the UE 315 (for example, in the communication 325 and the communication 330) passes through and is relayed by the relay device 310.

Using the communication scheme shown in FIG. 3 may improve network performance and increase reliability by providing the UE 305 with link diversity for communicating with the UE 315. For millimeter wave (for example, frequency range 2, or FR2) communications, which are susceptible to link blockage and link impairment, this link diversity improves reliability and prevents multiple retransmissions of data that may otherwise be retransmitted in order to achieve a successful communication. Similarly, for V2X communications, which may be associated with a limited spectrum for communications, this link diversity improves reliability and prevents multiple retransmissions of data that may otherwise be retransmitted in order to achieve a successful communication. However, techniques described herein are not limited to millimeter wave communications, and may be used for sub-6 gigahertz (for example, frequency range 1, or FR1) communications.

In some cases, the UE 305 may transmit a communication (for example, the same communication) to the UE 315 via both the sidelink 335 and the indirect link 340. In other cases, the UE 305 may select one of the links (for example, either the sidelink 335 or the indirect link 340), and may transmit a communication to the UE 315 using only the selected link. Alternatively, the UE 305 may receive an indication of one of the links (for example, either the sidelink 335 or the indirect link 340), and may transmit a communication to the UE 315 using only the indicated link. The indication may be transmitted by the UE 315 or the relay device 310. In some aspects, such selection or indication may be based at least in part on channel conditions or link reliability.

In some aspects, the techniques and apparatuses for security protection of UE-to-UE relay discovery described herein may be applied to the relaying of communications between UEs as described in connection with FIG. 3.

As indicated above, FIG. 3 is provided as an example. Other examples may differ from what is described with respect to FIG. 3.

A wireless communication system may be capable of supporting proximity services (ProSe) that enable direct communication between UEs, such as sidelink communication over a PC5 interface. Notably, ProSe can provide both discovery capabilities and communication capabilities in association with enabling direct communication between UEs.

Additionally, the wireless communication system may be capable of supporting UE-to-UE relaying. UE-to-UE relaying can be utilized to enable coverage extension of communications between UEs. That is, UE-to-UE relaying can be utilized to support or enhance communications between UEs that are enabled by ProSe. A relay UE (R-UE) is a UE that relays traffic between a source UE (S-UE) and a destination UE (D-UE). The S-UE is the UE that is the originator of the relayed traffic, while the D-UE is the UE that is the destination of the relayed traffic. UE-to-UE relaying can support single-hop relaying (for example, a single R-UE between the S-UE and the D-UE) or multi-hop relaying (for example, more than one R-UE in communication with one other to support relaying between the S-UE and the D-UE).

To utilize or participate in UE-to-UE relaying, a given UE communicates with a network entity (for example, a base station) to perform UE-to-UE relaying authorization and provisioning. After authorization and provisioning by the network entity, the UE performs a relay discovery procedure associated with discovering relay UEs in range of the UE. A first approach for enabling a UE to perform discovery of R-UEs is a proactive approach. According to the proactive approach, an announcing R-UE transmits a message to indicate its presence to other UEs. Here, monitoring UEs that are monitoring for such messages may receive the message transmitted by the announcing R-UE and, therefore, may discover the announcing R-UE. A second approach for enabling a UE to perform discovery of R-UEs is an on-demand approach. According to the on-demand approach, a discoverer UE transmits a message requesting that any discoveree R-UEs that receive the message transmit a response indicating their presence. Here, a discoveree R-UE monitoring for such messages receives the message transmitted by the discoverer UE and transmits a response indicating its presence. The discoverer UE may receive the response transmitted by the discoveree R-UE and, therefore, may discover the discoveree R-UE. A message transmitted by a given R-UE in association with performing relay discovery can include a relay service code (RSC) that identifies the R-UE and a UE-to-UE relay layer indicator that indicates whether the R-UE supports Layer 3 (L3) or Layer 2 (L2) UE-to-UE relay operation.

After relay discovery, a UE can perform a route discovery procedure to discover a UE-to-UE relaying route to be utilized for reaching a particular UE. For example, to perform relay discovery, the UE may need to discover one or more R-UEs that provide a route between the UE and a particular UE (for example, when the particular UE has not been discovered by the UE, such as when the particular UE is out-of-coverage). The particular UE may be, for example, a UE supporting a ProSe service, a UE that is a member of a specific group of UEs, or a UE that corresponds to application user information associated with the UE, among other examples. Notably, as described below, an RSC-based discovery procedure can be used to support forwarding of ProSe discovery messages via one or more R-UEs. Further, information used by a UE for ProSe discovery can be included in end-to-end UE discovery information within a message associated with performing route discovery.

Route discovery can be performed using a proactive approach or an on-demand approach. According to the proactive approach, an announcing UE may broadcast an announcement message intended for a monitoring UE. The announcement message may include, for example, user information associated with the announcing UE, an RSC associated with the announcing UE, and end-to-end discovery information associated with the monitoring UE (for example, information that identifies or can be used to identify the monitoring UE). In one example, an R-UE receives the announcement message, adds information associated with the R-UE (for example, user information associated with the R-UE, an RSC associated with the R-UE, or a UE-to-UE layer indication associated with the R-UE, among other examples) to the announcement message, and re-broadcasts the announcement message including the additional information. Here, the monitoring UE receives the re-broadcasted announcement message and determines that the announcement message originated from the announcing UE and is intended for the monitoring UE. The monitoring UE may then discover the route to the announcing UE via the R-UE. Notably, the monitoring UE may discover one or more routes to the announcing UE in this manner. Further, the announcement message may be received, modified, and transmitted by multiple R-UEs. That is, a given discovered route between the announcing UE and the monitoring UE may include hops through multiple R-UEs.

According to the on-demand approach, a discoverer UE may broadcast a solicitation message intended for a discoveree UE. The solicitation message may include, for example, user information associated with the discoverer UE, an RSC associated with the discoverer UE, and end-to-end discovery information associated with the discoveree UE (for example, information that identifies or can be used to identify the discoveree UE). In one example, an R-UE receives the solicitation message, adds information associated with the R-UE (for example, user information associated with the R-UE, an RSC associated with the R-UE, or a UE-to-UE layer indication associated with the R-UE, among other examples) to the solicitation message, and re-broadcasts the solicitation message including the additional information. Here, the discoveree UE receives the re-broadcasted solicitation message and determines that the solicitation message originated from the discoverer UE and is intended for the discoveree UE. The discoveree UE may then discover the route to the discoverer UE via the R-UE. Further, according to the on-demand approach, the discoveree UE may broadcast a solicitation response message intended for the discoverer UE. The solicitation response message may include, for example, user information associated with the discoveree UE, an RSC associated with the discoveree UE, and end-to-end discovery information associated with the discoverer UE (for example, information that identifies or can be used to identify the discoverer UE). In this example, the R-UE receives the solicitation response message, adds information associated with the R-UE (for example, user information associated with the R-UE, an RSC associated with the R-UE, or a UE-to-UE layer indication associated with the R-UE) to the solicitation response message, and re-broadcasts the solicitation response message including the additional information. Here, the discoverer UE receives the re-broadcasted solicitation response message and determines that the solicitation message originated from the discoveree UE and is intended for the discoverer UE. The discoverer UE may then discover the route to the discoveree UE via the R-UE. Notably, one or more routes between the discoverer UE and the discoveree UE can be discovered in this manner. Further, the solicitation message or the solicitation response message may be received, modified, and transmitted by multiple R-UEs. That is, a given discovered route between the discoverer UE and the discoveree UE may include hops through multiple R-UEs.

After route discovery, a UE can perform a route selection procedure to select a route to be utilized for UE-to-UE relaying. The route selection procedure can be used by a UE (for example, an S-UE or a D-UE) to select a route from a set of discovered routes. Route selection can be performed based on some criteria configured on the UE. For example, the UE may be configured with radio link quality criteria that indicate a threshold for a reference signal (for example, a sidelink discovery reference signal received power (SD-RSRP) threshold, or a sidelink reference signal received power (SL-RSRP) threshold). Here, the UE may select a route for which the radio link criteria are satisfied (for example, a route for which the SD-RSRP threshold is satisfied, or a route for which the SL-RSRP threshold is satisfied). When the UE is in coverage, the UE can be configured with the criteria for performing route selection via a system information block (SIB). Conversely, when the UE is out-of-coverage the UE may utilize criteria that are pre-configured on the UE.

After route selection, UE-to-UE relay connection setup is performed, and communication between an S-UE and a D-UE can be performed over the selected route utilizing UE-to-UE relaying. Notably, after relay connection setup is performed, mobility management can be utilized to, for example, re-select the route or perform relay connection management (for example, additional relay connection setup, modification of the relay connection, or release of the relay connection, among other examples).

Notably, a given discovery message (for example, an announcement message, a solicitation message, a solicitation response message) used in association with performing route discovery is transmitted over-the-air. However, the discovery message does not have security protection. Therefore, an attacker that receives the discovery message over-the-air could, for example, obtain private information from the discovery message, spoof the discovery message to enable unauthorized use of a discovery service or degrade performance of a discovery service, or relay the discovery message to deceive other discovery service UEs.

Various aspects relate generally to security protection for UE-to-UE relay discovery. Some aspects more specifically relate to security protection for discovery messages associated with a route discovery procedure. In some aspects, a discovery message may be protected using a set of CSSPs and a set of CRSPs associated with the discovery service. Additionally, in some aspects, an end-to-end ProSe direct discovery IE included in the discovery message may be further protected using a set of CSSPs and a set of CRSPs associated with end-to-end ProSe direct discovery. Additional details are provided below.

Particular aspects of the subject matter described in this disclosure can be implemented to realize one or more of the following potential advantages. In some examples, the described techniques can be used to improve security for route discovery associated with UE-to-UE relaying. For example, the techniques and apparatuses described herein may prevent an attacker from obtaining private information from a discovery message, spoofing a discovery message, or relay the discovery message for the purpose of deceiving other discovery service UEs. In this way, security and performance associated with route discovery for UE-to-UE relaying can be improved, thereby improving overall performance and security for UE-to-UE relaying.

Figure 4A:
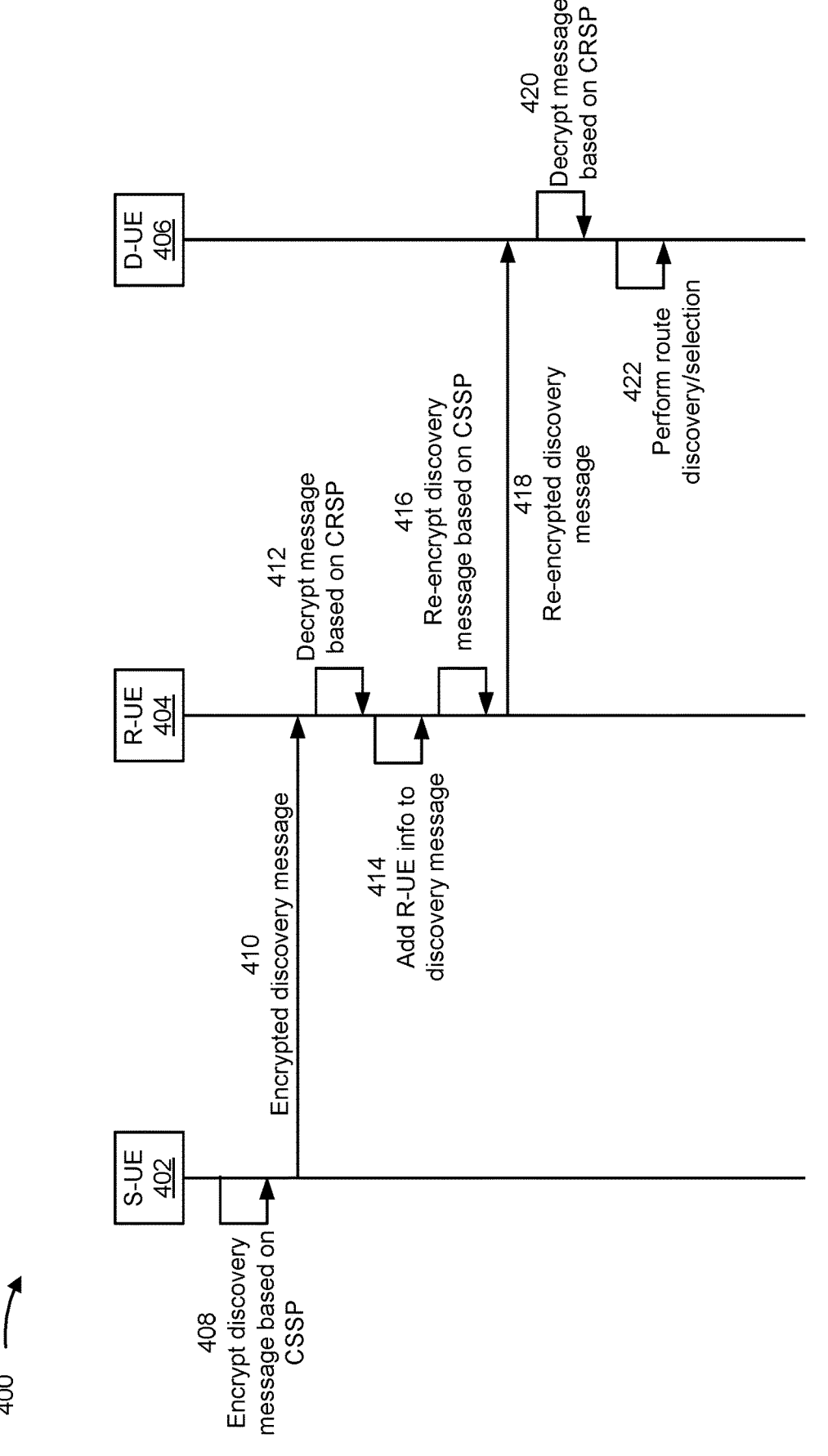
FIGS. 4A and 4B are diagrams illustrating examples associated with security protection of UE-to-UE relay discovery, in accordance with the present disclosure.
Figure 4B:
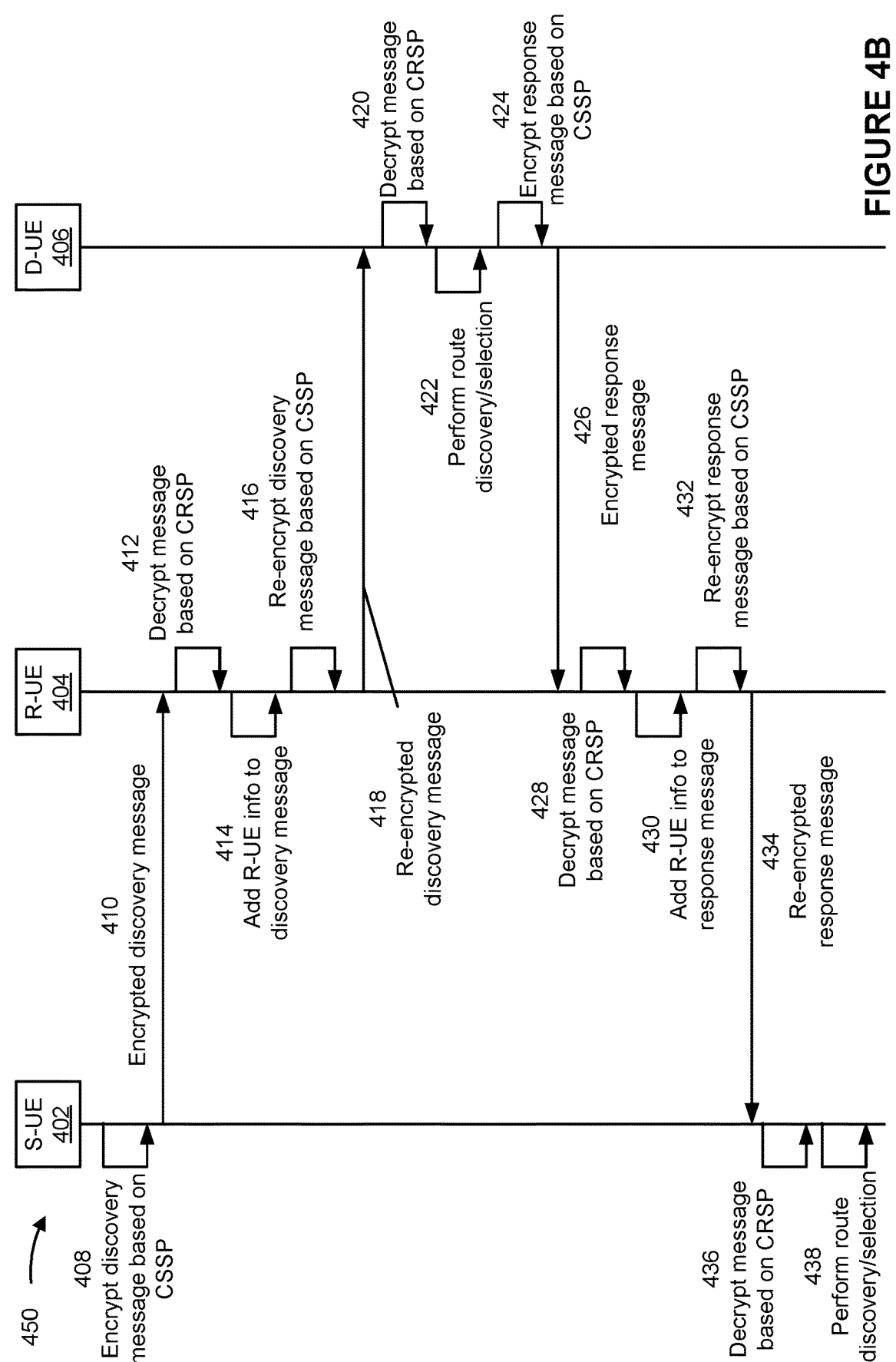

FIGS. 4A and 4B are diagrams illustrating examples 400 and 450, respectively, associated with security protection of UE-to-UE relay discovery, in accordance with the present disclosure. In examples 400 and 450, route discovery is to be performed in association with discovery of a route for a relay service that supports communication between an S-UE 402 (for example, a first UE 120) and a D-UE 406 (for example, a second UE 120). Notably, in examples 400 and 450, an R-UE 404 (for example, a third UE 120) is in a location that enables the R-UE 404 to relay communications between the S-UE 402 and the D-UE 406.

Example 400 in FIG. 4A is an example that uses a proactive approach for route discovery. That is, in example 400, the S-UE 402 is an announcing UE and the D-UE 406 is a monitoring UE.

In a first operation 408, the S-UE 402 may encrypt a discovery message associated with a relay service based at least in part on a set of CSSPs associated with the relay service. The set of CSSPs associated with the relay service includes a set of parameters based at least in part on which a given UE (for example, the S-UE 402, the R-UE 404, or the D-UE 406) can encrypt or otherwise secure the discovery message (for example, the entire discovery message). In some aspects, encryption of the discovery message based at least in part on the set of CSSPs associated with the relay service provides hop-by-hop security for the discovery message.

In some aspects, the discovery message comprises information associated with performing route discovery. For example, the discovery message may include user information associated with the S-UE 402 or an RSC associated with the S-UE 402. In some aspects, the discovery message includes discovery information, such as an information element (IE) associated with service discovery or an IE associated with group member discovery. For example, the discovery information may in some aspects include a proximity services (ProSe) direct discovery message. In some aspects, the discovery information is included in a ProSe direct discovery IE of the discovery message.

In some aspects, the S-UE 402 may encrypt the discovery information included in the discovery message based at least in part on a set of CSSPs associated with end-to-end ProSe direct discovery. For example, the discovery message may include an end-to-end ProSe direct discovery IE, and the S-UE 402 may encrypt the end-to-end ProSe direct discovery IE based at least in part on a set of CSSPs associated with end-to-end ProSe direct discovery. That is, in some aspects, the S-UE 402 may encrypt the discovery information using a first set of security parameters (for example, the set of CSSPs associated with the end-to-end ProSe direct discovery) and may then encrypt the discovery message (including the encrypted end-to-end ProSe direct discovery IE) based at least in part on a second set of security parameters (for example, the set of CSSPs associated with the relay service). In some aspects, encryption of the discovery information based at least in part on the set of CSSPs associated with end-to-end ProSe direct discovery provides end-to-end security for the discovery information (for example, because the R-UE 404 will not be configured with a set of CRSPs needed to decrypt the discovery information). Notably, the set of CSSPs associated with the end-to-end ProSe direct discovery are different than the set of CSSPs associated with the relay service.

In a second operation 410, the S-UE 402 may transmit, and the R-UE 404 may receive, the encrypted discovery message. For example, the S-UE 402 may broadcast the encrypted discovery message, and the R-UE 404 may receive the encrypted discovery message.

In a third operation 412, the R-UE 404 may decrypt the encrypted discovery message based at least in part on a set of CRSPs associated with the relay service. The set of CRSPs associated with the relay service includes a set of parameters based at least in part on which a given UE (for example, the S-UE 402, the R-UE 404, or the D-UE 406) can decrypt the discovery message (for example, the entire discovery message). In some aspects, the set of CRSPs associated with the relay service enable decryption of a discovery message encrypted using the set of CSSPs associated with the relay service. Here, configuring the S-UE 402, the R-UE 404, and the D-UE 406 with the set of CSSPs and the set of CRSPs associated with the relay service provides hop-by-hop protection for the discovery message.

In a fourth operation 414, the R-UE 404 may add information associated with the relay service to the discovery message. For example, the R-UE 404 may add information associated with the R-UE 404 (for example, user information associated with the R-UE 404, an RSC associated with the R-UE 404, or a UE-to-UE layer indication associated with the R-UE 404) to the discovery message.

In a fifth operation 416, the R-UE 404 may re-encrypt the discovery message based at least in part on the set of CSSPs associated with the relay service after adding the information associated with the relay service to the discovery message. Notably, the R-UE 404 re-encrypts the discovery message (after adding the information associated with the R-UE 404) using the same set of CSSPs used by the S-UE 402 to encrypt the discovery message.

In a sixth operation 418, the R-UE 404 may transmit, and the D-UE 406 may receive, the re-encrypted discovery message. For example, the R-UE 404 may transmit the re-encrypted discovery message, and the D-UE 406 may receive the re-encrypted discovery message broadcasted by the R-UE 404.

In a seventh operation 420, the D-UE 406 may decrypt the encrypted discovery message based at least in part on the set of CRSPs associated with a relay service. Notably, the D-UE 406 decrypts the re-encrypted discovery message using the same set of CRSPs used by the R-UE 404 to decrypt the discovery message received from the S-UE 402.

In some aspects, the D-UE 406 may decrypt the discovery information included in the discovery message based at least in part on a set of CRSPs associated with end-to-end ProSe direct discovery. For example, as described above, the discovery message may include an encrypted end-to-end ProSe direct discovery IE, and the D-UE 406 may decrypt the end-to-end ProSe direct discovery IE based at least in part on a set of CRSPs associated with end-to-end ProSe direct discovery. That is, in some aspects, the D-UE 406 may decrypt the discovery message (including the encrypted end-to-end ProSe direct discovery IE) based at least in part on a first set of security parameters (for example, the set of CRSPs associated with the relay service), and may then decrypt the encrypted discovery information using a second set of security parameters (for example, the set of CRSPs associated with the end-to-end ProSe direct discovery). In this way, end-to-end security for the discovery information can be provided (for example, because the R-UE 404 is not configured with the set of CRSPs needed to decrypt discovery information). Notably, the set of CRSPs associated with the end-to-end ProSe direct discovery are different than the set of CRSPs associated with the relay service.

In an eighth operation 422, the D-UE 406 may perform a route discovery procedure or a route selection procedure associated with the relay service based at least in part on the discovery message.

Example 450 in FIG. 4B is an example that uses an on-demand approach for route discovery. Therefore, in example 450, the S-UE 402 is a discoverer UE and the D-UE 406 is a discoveree UE. In example 450, the S-UE 402, R-UE 404, and the D-UE 406 may perform operations 408 through 422 in a manner similar to that described above with respect to example 400 of FIG. 4A.

After operations 408 through 422, in a ninth operation 424, the D-UE 406 may encrypt a response message associated with the relay service based at least in part on the set of CSSPs associated with the relay service.

In some aspects, the response message comprises information associated with performing route discovery. For example, the response message may include user information associated with the D-UE 406 or an RSC associated with the D-UE 406. In some aspects, the response message includes discovery information, such as an IE associated with service discovery or an IE associated with group member discovery. For example, the response information may in some aspects include a ProSe direct discovery message. In some aspects, the discovery information is included in a ProSe direct discovery IE of the response message.

In some aspects, the D-UE 406 may encrypt the discovery information included in the response message based at least in part on a set of CSSPs associated with end-to-end ProSe direct discovery. For example, the response message may include an end-to-end ProSe direct discovery IE, and the D-UE 406 may encrypt the end-to-end ProSe direct discovery IE based at least in part on a set of CSSPs associated with end-to-end ProSe direct discovery. That is, in some aspects, the D-UE 406 may encrypt the discovery information using a first set of security parameters (for example, the set of CSSPs associated with the end-to-end ProSe direct discovery) and may then encrypt the response message (including the encrypted end-to-end ProSe direct discovery IE) based at least in part on a second set of security parameters (for example, the set of CSSPs associated with the relay service). In some aspects, encryption of the discovery information based at least in part on the set of CSSPs associated with end-to-end ProSe direct discovery provides end-to-end security for the discovery information (for example, because the R-UE 404 will not be configured with a set of CRSPs needed to decrypt the discovery information). Notably, the set of CSSPs associated with the end-to-end ProSe direct discovery are different than the set of CSSPs associated with the relay service.

The set of CSSPs associated with the end-to-end ProSe direct discovery used by the D-UE 406 to encrypt the end-to-end ProSe direct discovery IE in the response message can be different than the set of CSSPs associated with the end-to-end ProSe direct discovery that is used by the S-UE 402 to encrypt the end-to-end ProSe direct discovery IE in the discovery message. Similarly, the set of CRSPs associated with the end-to-end ProSe direct discovery used by the D-UE 406 to decrypt the end-to-end ProSe direct discovery IE in the discovery message can be different than the set of CRSPs associated with the end-to-end ProSe direct discovery that is used by the S-UE 402 to decrypt the end-to-end ProSe direct discovery IE in the response message. In other words, in some aspects, the S-UE 402 utilizes a first set of CSSPs associated with the end-to-end ProSe direct discovery (CSSP_ProSe1) to encrypt the end-to-end ProSe direct discovery IE in the discovery message, and the D-UE 406 utilizes a corresponding first set of CRSPs associated with the end-to-end ProSe direct discovery (CRSP_ProSe1) to decrypt the encrypted end-to-end ProSe direct discovery IE in the discovery message. Conversely, the D-UE 406 utilizes a second set of CSSPs associated with the end-to-end ProSe direct discovery (CSSP_ProSe2) to encrypt the end-to-end ProSe direct discovery IE in the response message, and the S-UE 402 utilizes a corresponding second set of CRSPs associated with the end-to-end ProSe direct discovery (CRSP_ProSe2) to decrypt the encrypted end-to-end ProSe direct discovery IE in the response message.

In a tenth operation 426, the D-UE 406 may transmit, and the R-UE 404 may receive, the encrypted response message. For example, the D-UE 406 may broadcast the encrypted response message, and the R-UE 404 may receive the encrypted response message.

In an eleventh operation 428, the R-UE 404 may decrypt the encrypted response message based at least in part on the set of CRSPs associated with the relay service.

In a twelfth operation 430, the R-UE 404 may add information associated with the relay service to the response message. For example, the R-UE 404 may add information associated with the R-UE 404 (for example, user information associated with the R-UE 404, an RSC associated with the R-UE 404, or a UE-to-UE layer indication associated with the R-UE 404) to the response message.

In a thirteenth operation 432, the R-UE 404 may re-encrypt the response message based at least in part on the set of CSSPs associated with the relay service after adding the information associated with the relay service to the response message. Notably, the R-UE 404 re-encrypts the response message (after adding the information associated with the R-UE 404) using the same set of CSSPs used by the D-UE 406 to encrypt the response message.

In a fourteenth operation 434, the R-UE 404 may transmit, and the S-UE 402 may receive, the re-encrypted response message. For example, the R-UE 404 may transmit the re-encrypted response message, and the S-UE 402 may receive the re-encrypted response message broadcasted by the R-UE 404.

In a fifteenth operation 436, the S-UE 402 may decrypt the encrypted response message based at least in part on the set of CRSPs associated with a relay service. Notably, the S-UE 402 decrypts the re-encrypted response message using the same set of CRSPs used by the R-UE 404 to decrypt the response message received from the D-UE 406.

In some aspects, the S-UE 402 may decrypt the discovery information included in the response message based at least in part on a set of CRSPs associated with end-to-end ProSe direct discovery. For example, as described above, the response message may include an encrypted end-to-end ProSe direct discovery IE, and the S-UE 402 may decrypt the end-to-end ProSe direct discovery IE based at least in part on a set of CRSPs associated with end-to-end ProSe direct discovery. That is, in some aspects, the S-UE 402 may decrypt the response message (including the encrypted end-to-end ProSe direct discovery IE) based at least in part on a first set of security parameters (for example, the set of CRSPs associated with the relay service), and may then decrypt the encrypted discovery information using a second set of security parameters (for example, the set of CRSPs associated with the end-to-end ProSe direct discovery). In this way, end-to-end security for the discovery information can be provided (for example, because the R-UE 404 is not configured with the set of CRSPs needed to decrypt the discovery information). Notably, the set of CRSPs associated with the end-to-end ProSe direct discovery is different than the set of CRSPs associated with the relay service.

In a sixteenth operation 438, the S-UE 402 may perform a route discovery procedure or a route selection procedure associated with the relay service based at least in part on the discovery message.

In this way, hop-by-hop security can be provided using the set of CSSPs and the set of CRSPs associated with the relay service and, optionally, end-to-end security can be provided using the set of CSSPs and the set of CRSPs associated with end-to-end ProSe direct discovery. As a result, security of the discovery messages is provided, thereby preventing an attacker from manipulating or interfering with route discovery.

As indicated above, FIGS. 4A and 4B are provided as examples. Other examples may differ from what is described with respect to FIGS. 4A and 4B.

Figure 5:
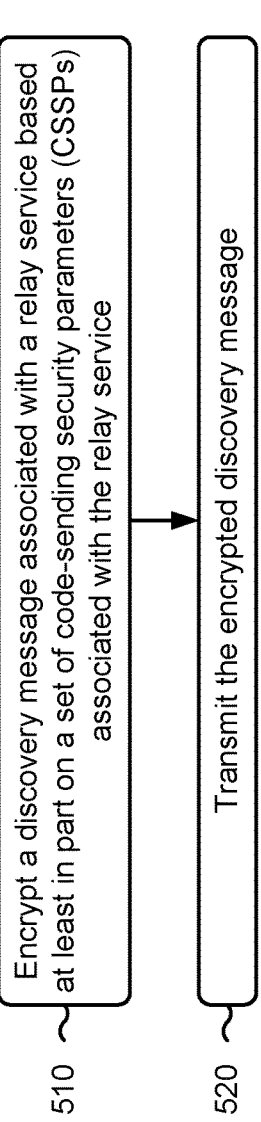

FIG. 5 is a flowchart illustrating an example process 500 performed, for example, by a UE in accordance with the present disclosure. Example process 500 is an example where the UE (for example, UE 120) performs operations associated with security protection of UE-to-UE relay discovery.

As shown in FIG. 5, in some aspects, process 500 may include encrypting a discovery message associated with a relay service based at least in part on a set of CSSPs associated with the relay service (block 510). For example, the UE (such as by using communication manager 140 or UE-to-UE relay component 808, depicted in FIG. 8) may encrypt a discovery message associated with a relay service based at least in part on a set of CSSPs associated with the relay service, as described above.

As further shown in FIG. 5, in some aspects, process 500 may include transmitting the encrypted discovery message (block 520). For example, the UE (such as by using communication manager 140 or transmission component 804, depicted in FIG. 8) may transmit the encrypted discovery message, as described above.

Process 500 may include additional aspects, such as any single aspect or any combination of aspects described below or in connection with one or more other processes described elsewhere herein.

In a first additional aspect, the discovery message comprises an end-to-end ProSe direct discovery IE, and encrypting the discovery message comprises encrypting the end-to-end ProSe direct discovery IE based at least in part on a set of CSSPs associated with end-to-end ProSe direct discovery.

In a second additional aspect, alone or in combination with the first aspect, the set of CSSPs associated with the end-to-end ProSe direct discovery that is used to encrypt the end-to-end ProSe direct discovery IE is different than a set of CSSPs associated with the end-to-end ProSe direct discovery that is to be used by another UE to encrypt end-to-end ProSe direct discovery IEs.

In a third additional aspect, alone or in combination with one or more of the first and second aspects, the discovery message comprises discovery information.

In a fourth additional aspect, alone or in combination with one or more of the first through third aspects, the discovery information is included in a ProSe direct discovery IE in the discovery message.

In a fifth additional aspect, alone or in combination with one or more of the first through fourth aspects, the discovery message is a ProSe direct discovery message.

In a sixth additional aspect, alone or in combination with one or more of the first through fifth aspects, process 500 includes encrypting the discovery information based at least in part on a set of CSSPs end-to-end ProSe direct discovery.

In a seventh additional aspect, alone or in combination with one or more of the first through sixth aspects, the discovery message comprises discovery information that includes at least one of an IE associated with service discovery or an IE associated with group member discovery.

In an eighth additional aspect, alone or in combination with one or more of the first through seventh aspects, process 500 includes receiving an encrypted response message that includes a response message associated with the relay service, and decrypting the encrypted response message based at least in part on a set of CRSPs associated with the relay service.

In a ninth additional aspect, alone or in combination with one or more of the first through eighth aspects, decrypting the encrypted response message comprises decrypting an encrypted end-to-end ProSe direct discovery IE, included in the response message, based at least in part on a set of CRSPs associated with end-to-end ProSe direct discovery.

In a tenth additional aspect, alone or in combination with one or more of the first through ninth aspects, the set of CRSPs associated with the end-to-end ProSe direct discovery that is used to decrypt the encrypted end-to-end ProSe direct discovery IE is different than a set of CRSPs associated with the end-to-end ProSe direct discovery that is to be used by another UE to decrypt encrypted end-to-end ProSe direct discovery IEs.

In an eleventh additional aspect, alone or in combination with one or more of the first through tenth aspects, process 500 includes performing a route discovery procedure associated with the relay service or a route selection procedure associated with the relay service based at least in part on the response message.

In a twelfth additional aspect, alone or in combination with one or more of the first through eleventh aspects, the response message comprises discovery information that includes at least one of an IE associated with service discovery or an IE associated with group member discovery.

Although FIG. 5 shows example blocks of process 500, in some aspects, process 500 may include additional blocks, fewer blocks, different blocks, or differently arranged blocks than those depicted in FIG. 5. Additionally or alternatively, two or more of the blocks of process 500 may be performed in parallel.

FIG. 6 is a flowchart illustrating an example process 600 performed, for example, by a UE in accordance with the present disclosure. Example process 600 is an example where the UE (for example, UE 120) performs operations associated with security protection of UE-to-UE relay discovery.

As shown in FIG. 6, in some aspects, process 600 may include receiving an encrypted discovery message (block 610). For example, the UE (such as by using communication manager 140 or reception component 802, depicted in FIG. 8) may receive an encrypted discovery message, as described above.

As further shown in FIG. 6, in some aspects, process 600 may include decrypting the encrypted discovery message based at least in part on a set of CRSPs associated with a relay service (block 620). For example, the UE (such as by using communication manager 140 or UE-to-UE relay component 808, depicted in FIG. 8) may decrypt the encrypted discovery message based at least in part on a set of CRSPs associated with a relay service, as described above.

As further shown in FIG. 6, in some aspects, process 600 may include adding information associated with the relay service to the discovery message (block 630). For example, the UE (such as by using communication manager 140 or UE-to-UE relay component 808, depicted in FIG. 8) may add information associated with the relay service to the discovery message, as described above.

As further shown in FIG. 6, in some aspects, process 600 may include re-encrypting the discovery message based at least in part on a set of CSSPs associated with the relay service after adding the information associated with the relay service to the discovery message (block 640). For example, the UE (such as by using communication manager 140 or UE-to-UE relay component 808, depicted in FIG. 8) may re-encrypt the discovery message based at least in part on a set of CSSPs associated with the relay service after adding the information associated with the relay service to the discovery message, as described above.

As further shown in FIG. 6, in some aspects, process 600 may include transmitting the re-encrypted discovery message (block 650). For example, the UE (such as by using communication manager 140 or transmission component 804, depicted in FIG. 8) may transmit the re-encrypted discovery message, as described above.

Process 600 may include additional aspects, such as any single aspect or any combination of aspects described below or in connection with one or more other processes described elsewhere herein.

In a first additional aspect, the discovery message comprises discovery information.

In a second additional aspect, alone or in combination with the first aspect, the discovery information is included in a ProSe direct discovery IE in the discovery message.

In a third additional aspect, alone or in combination with one or more of the first and second aspects, the discovery message is a ProSe direct discovery message.

In a fourth additional aspect, alone or in combination with one or more of the first through third aspects, the discovery message comprises discovery information that includes at least one of an IE associated with service discovery or an IE associated with group member discovery.

In a fifth additional aspect, alone or in combination with one or more of the first through fourth aspects, process 600 includes receiving an encrypted response message, decrypting the encrypted response message based at least in part on the set of CRSPs associated with the relay service, adding the information associated with the relay service to the response message, re-encrypting the response message based at least in part on the set of CSSPs associated with the relay service after adding the information associated with the relay service to the response message, and transmitting the re-encrypted response message.

In a sixth additional aspect, alone or in combination with one or more of the first through fifth aspects, the response message comprises discovery information that includes at least one of an IE associated with service discovery or an IE associated with group member discovery.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
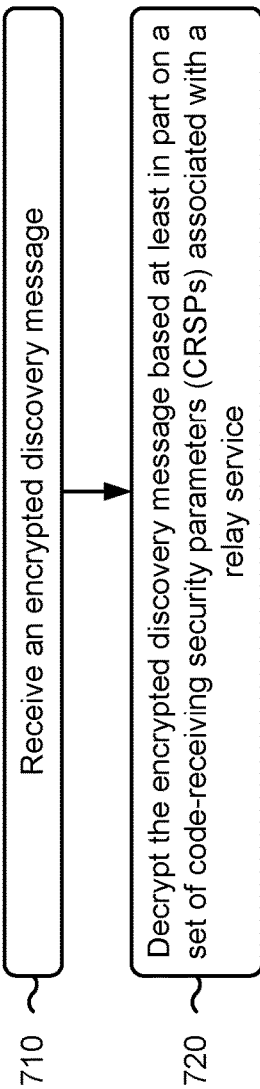

FIG. 7 is a flowchart illustrating an example process 700 performed, for example, by a UE in accordance with the present disclosure. Example process 700 is an example where the UE (for example, UE 120) performs operations associated with security protection of UE-to-UE relay discovery.

As shown in FIG. 7, in some aspects, process 700 may include receiving an encrypted discovery message (block 710). For example, the UE (such as by using communication manager 140 or reception component 802, depicted in FIG. 8) may receive an encrypted discovery message, as described above.

As further shown in FIG. 7, in some aspects, process 700 may include decrypting the encrypted discovery message based at least in part on a set of CRSPs associated with a relay service (block 720). For example, the UE (such as by using communication manager 140 or UE-to-UE relay component 808, depicted in FIG. 8) may decrypt the encrypted discovery message based at least in part on a set of CRSPs associated with a relay service, as described above.

Process 700 may include additional aspects, such as any single aspect or any combination of aspects described below or in connection with one or more other processes described elsewhere herein.

In a first additional aspect, process 700 includes performing a route discovery procedure associated with the relay service or a route selection procedure associated with the relay service based at least in part on the discovery message.

In a second additional aspect, alone or in combination with the first aspect, the discovery message comprises discovery information.

In a third additional aspect, alone or in combination with one or more of the first and second aspects, the discovery information is included in a ProSe direct discovery IE in the discovery message.

In a fourth additional aspect, alone or in combination with one or more of the first through third aspects, the discovery message is a ProSe direct discovery message.

In a fifth additional aspect, alone or in combination with one or more of the first through fourth aspects, process 700 includes encrypting the discovery information based at least in part on a set of CSSPs associated with end-to-end ProSe direct discovery.

In a sixth additional aspect, alone or in combination with one or more of the first through fifth aspects, the discovery message comprises discovery information that includes at least one of an IE associated with service discovery or an IE associated with group member discovery.

In a seventh additional aspect, alone or in combination with one or more of the first through sixth aspects, the encrypted discovery message comprises an encrypted end-to-end ProSe direct discovery IE, and decrypting the encrypted discovery message comprises decrypting the encrypted ProSe direct discovery IE based at least in part on a set of CRSPs associated with end-to-end ProSe direct discovery.

In an eighth additional aspect, alone or in combination with one or more of the first through seventh aspects, the set of CRSPs associated with the end-to-end ProSe direct discovery that is used to decrypt the encrypted end-to-end ProSe direct discovery IE is different than a set of CRSPs associated with the end-to-end ProSe direct discovery that is to be used by another UE to decrypt encrypted end-to-end ProSe direct discovery IEs.

In a ninth additional aspect, alone or in combination with one or more of the first through eighth aspects, process 700 includes encrypting a response message associated with the relay service based at least in part on a set of CSSPs associated with the relay service, and transmitting the encrypted response message.

In a tenth additional aspect, alone or in combination with one or more of the first through ninth aspects, the response message comprises discovery information that includes at least one of an IE associated with service discovery or an IE associated with group member discovery.

In an eleventh additional aspect, alone or in combination with one or more of the first through tenth aspects, encrypting the response message comprises encrypting an end-to-end ProSe direct discovery IE, included in the response message, based at least in part on a set of CSSPs associated with end-to-end ProSe direct discovery.

In a twelfth additional aspect, alone or in combination with one or more of the first through eleventh aspects, the set of CSSPs associated with the end-to-end ProSe direct discovery that is used to encrypt the end-to-end ProSe direct discovery IE is different than a set of CSSPs associated with the end-to-end ProSe direct discovery that is to be used by another UE to encrypt end-to-end ProSe direct discovery IEs.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

Figure 8:
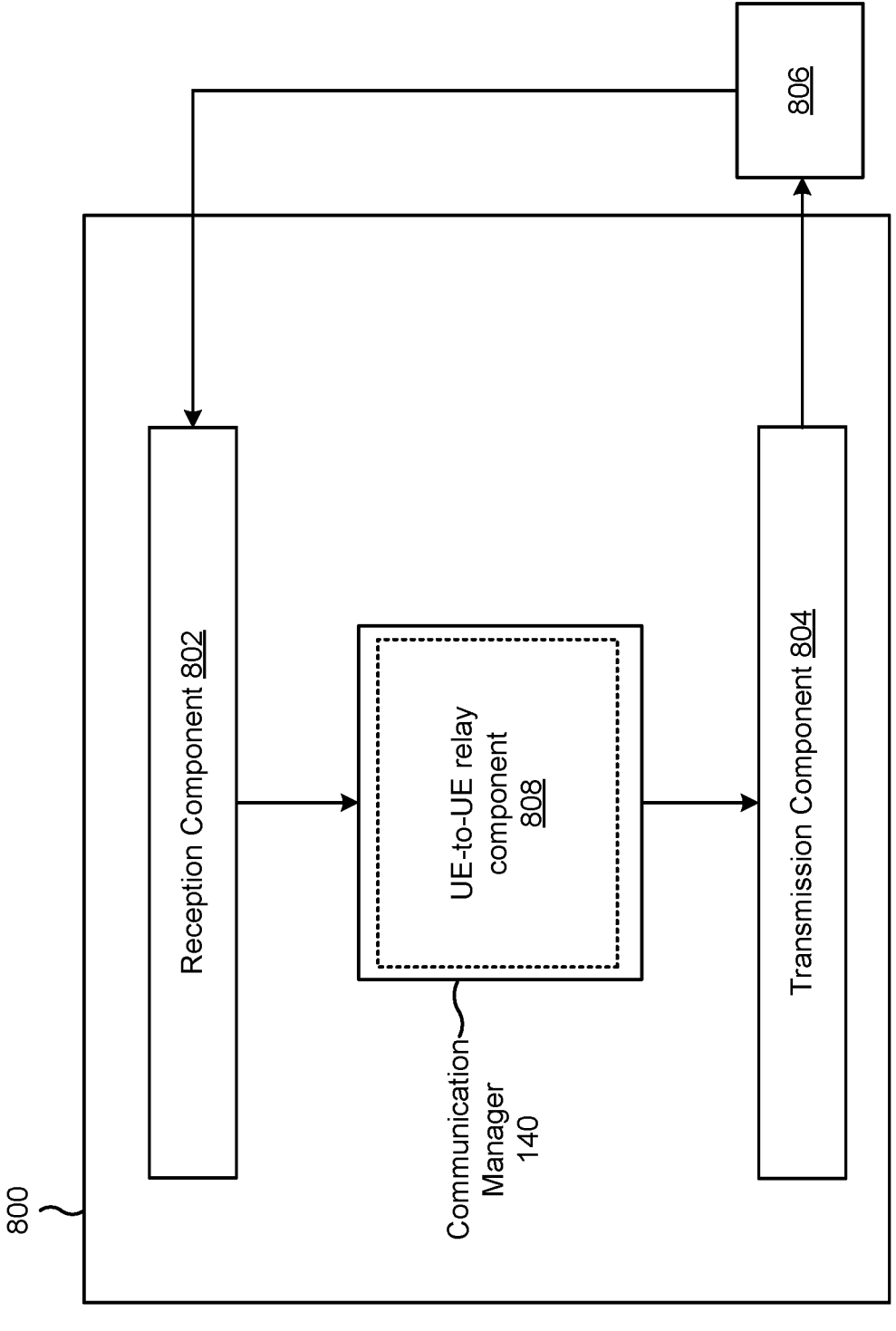
FIG. 8 is a diagram of an example apparatus for wireless communication in accordance with the present disclosure.

FIG. 8 is a diagram of an example apparatus 800 for wireless communication in accordance with the present disclosure. The apparatus 800 may be a UE, or a UE may include the apparatus 800. In some aspects, the apparatus 800 includes a reception component 802, a transmission component 804, and a communication manager 140, which may be in communication with one another (for example, via one or more buses). As shown, the apparatus 800 may communicate with another apparatus 806 (such as a UE, a base station, or another wireless communication device) using the reception component 802 and the transmission component 804.

In some aspects, the apparatus 800 may be configured to perform one or more operations described herein in connection with FIGS. 4A and 4B. Additionally or alternatively, the apparatus 800 may be configured to perform one or more processes described herein, such as process 500 of FIG. 5, process 600 of FIG. 6, process 700 of FIG. 7, or a combination thereof. In some aspects, the apparatus 800 may include one or more components of the UE described above in connection with FIG. 2.

The reception component 802 may receive communications, such as reference signals, control information, data communications, or a combination thereof, from the apparatus 806. The reception component 802 may provide received communications to one or more other components of the apparatus 800, such as the communication manager 140. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, the communication manager 140 may generate communications and may transmit the generated communications to the transmission component

804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

In some aspects, the communication manager 140 may encrypt a discovery message associated with a relay service based at least in part on a set of CSSPs associated with the relay service. The communication manager 140 may transmit or may cause the transmission component 804 to transmit the encrypted discovery message. In some aspects, the communication manager 140 may perform one or more operations described elsewhere herein as being performed by one or more components of the communication manager 140.

The communication manager 140 may receive or may cause the reception component 802 to receive an encrypted discovery message. The communication manager 140 may decrypt the encrypted discovery message based at least in part on a set of CRSPs associated with a relay service. The communication manager 140 may add information associated with the relay service to the discovery message. The communication manager 140 may re-encrypt the discovery message based at least in part on a set of CSSPs associated with the relay service after adding the information associated with the relay service to the discovery message. The communication manager 140 may transmit or may cause the transmission component 804 to transmit the re-encrypted discovery message. In some aspects, the communication manager 140 may perform one or more operations described elsewhere herein as being performed by one or more components of the communication manager 140.

The communication manager 140 may receive or may cause the reception component 802 to receive an encrypted discovery message. The communication manager 140 may decrypt the encrypted discovery message based at least in part on a set of CRSPs associated with a relay service. In some aspects, the communication manager 140 may perform one or more operations described elsewhere herein as being performed by one or more components of the communication manager 140.

The communication manager 140 may include a controller/processor, a memory, or a combination thereof, of the UE described above in connection with FIG. 2. In some aspects, the communication manager 140 includes a set of components, such as a UE-to-UE relay component 808. Alternatively, the set of components may be separate and distinct from the communication manager 140. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

In some aspects, the UE-to-UE relay component 808 may encrypt a discovery message associated with a relay service based at least in part on a set of CSSPs associated with the relay service. The transmission component 804 may transmit the encrypted discovery message.

The UE-to-UE relay component 808 may encrypt the discovery information based at least in part on a set of CSSPs associated with end-to-end ProSe direct discovery.

The reception component 802 may receive an encrypted response message that includes a response message associated with the relay service.

The UE-to-UE relay component 808 may decrypt the encrypted response message based at least in part on a set of CRSPs associated with the relay service.

The UE-to-UE relay component 808 may perform a route discovery procedure associated with the relay service or a route selection procedure associated with the relay service based at least in part on the response message.

In some aspects, the reception component 802 may receive an encrypted discovery message. The UE-to-UE relay component 808 may decrypt the encrypted discovery message based at least in part on a set of CRSPs associated with a relay service. The UE-to-UE relay component 808 may add information associated with the relay service to the discovery message. The UE-to-UE relay component 808 may re-encrypt the discovery message based at least in part on a set of CSSPs associated with the relay service after adding the information associated with the relay service to the discovery message. The transmission component 804 may transmit the re-encrypted discovery message.

The UE-to-UE relay component 808 may encrypt the discovery information based at least in part on a set of CSSPs associated with end-to-end ProSe direct discovery.

The reception component 802 may receive an encrypted response message.

The UE-to-UE relay component 808 may decrypt the encrypted response message based at least in part on the set of CRSPs associated with the relay service.

The UE-to-UE relay component 808 may add the information associated with the relay service to the response message.

The UE-to-UE relay component 808 may re-encrypt the response message based at least in part on the set of CSSPs associated with the relay service after adding the information associated with the relay service to the response message.

The transmission component 804 may transmit the re-encrypted response message.

In some aspects, the reception component 802 may receive an encrypted discovery message. The UE-to-UE relay component 808 may decrypt the encrypted discovery message based at least in part on a set of CRSPs associated with a relay service.

The UE-to-UE relay component 808 may perform a route discovery procedure associated with the relay service or a route selection procedure associated with the relay service based at least in part on the discovery message.

The UE-to-UE relay component 808 may encrypt the discovery information based at least in part on a set of CSSPs associated with end-to-end ProSe direct discovery.

The UE-to-UE relay component 808 may encrypt a response message associated with the relay service based at least in part on a set of CSSPs associated with the relay service.

The transmission component 804 may transmit the encrypted response message.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

The following provides an overview of some Aspects of the present disclosure:

Aspect 1: A method of wireless communication performed by a UE, comprising: encrypting a discovery message associated with a relay service based at least in part on a set of CSSPs associated with the relay service; and transmitting the encrypted discovery message.

Aspect 2: The method of Aspect 1, wherein the discovery message comprises an end-to-end ProSe direct discovery IE, and wherein encrypting the discovery message comprises encrypting the end-to-end ProSe direct discovery IE based at least in part on a set of CSSPs associated with end-to-end ProSe direct discovery.

Aspect 4: The method of any of Aspects 1-2, wherein the discovery message comprises discovery information.

Aspect 5: The method of Aspect 4, wherein the discovery information is included in a ProSe direct discovery IE in the discovery message.

Aspect 6: The method of any of Aspects 4-5, wherein the discovery message is a ProSe direct discovery message.

Aspect 7: The method of any of Aspects 4-6, further comprising encrypting the discovery information based at least in part on a set of CSSPs associated with end-to-end ProSe direct discovery.

Aspect 8: The method of any of Aspects 1-7, wherein the discovery message comprises discovery information that includes at least one of an IE associated with service discovery or an IE associated with group member discovery.

Aspect 9: The method of any of Aspects 1-8, further comprising: receiving an encrypted response message that includes a response message associated with the relay service; and decrypting the encrypted response message based at least in part on a set of CRSPs associated with the relay service.

Aspect 10: The method of Aspect 9, wherein decrypting the encrypted response message comprises decrypting an encrypted end-to-end ProSe direct discovery IE, included in the response message, based at least in part on a set of CRSPs associated with end-to-end ProSe direct discovery.

Aspect 11: The method of any of Aspects 9-10, wherein the set of CRSPs associated with the end-to-end ProSe direct discovery that is used to decrypt the encrypted end-to-end ProSe direct discovery IE is different than a set of CRSPs associated with the end-to-end ProSe direct discovery that is to be used by another UE to decrypt encrypted end-to-end ProSe direct discovery IEs.

Aspect 12: The method of any of Aspects 9-11, further comprising performing a route discovery procedure associated with the relay service or a route selection procedure associated with the relay service based at least in part on the response message.

Aspect 13: The method of any of Aspects 9-12, wherein the response message comprises discovery information that includes at least one of an IE associated with service discovery or an IE associated with group member discovery.

Aspect 14: A method of wireless communication performed by a UE, comprising: receiving an encrypted discovery message; decrypting the encrypted discovery message based at least in part on a set of CRSPs associated with a relay service; adding information associated with the relay service to the discovery message; re-encrypting the discovery message based at least in part on a set of CSSPs associated with the relay service after adding the information associated with the relay service to the discovery message; and transmitting the re-encrypted discovery message.

Aspect 15: The method of Aspect 14, wherein the discovery message comprises discovery information.

Aspect 16: The method of Aspect 15, wherein the discovery information is included in a ProSe direct discovery IE in the discovery message.

Aspect 17: The method of any of Aspects 15-16, wherein the discovery message is a ProSe direct discovery message.

Aspect 18: The method of any of Aspects 14-18, wherein the discovery message comprises discovery information that includes at least one of an IE associated with service discovery or an IE associated with group member discovery.

Aspect 19: The method of any of Aspects 14-19, further comprising: receiving an encrypted response message; decrypting the encrypted response message based at least in part on the set of CRSPs associated with the relay service; adding the information associated with the relay service to the response message; re-encrypting the response message based at least in part on the set of CSSPs associated with the relay service after adding the information associated with the relay service to the response message; and transmitting the re-encrypted response message.

Aspect 20: The method of Aspect 20, wherein the response message comprises discovery information that includes at least one of an IE associated with service discovery or an IE associated with group member discovery.

Aspect 21: A method of wireless communication performed by a UE, comprising: receiving an encrypted discovery message; and decrypting the encrypted discovery message based at least in part on a set of CRSPs associated with a relay service.

Aspect 22: The method of Aspect 22, further comprising performing a route discovery procedure associated with the relay service or a route selection procedure associated with the relay service based at least in part on the discovery message.

Aspect 23: The method of any of Aspects 22-23, wherein the discovery message comprises discovery information.

Aspect 24: The method of Aspect 24, wherein the discovery information is included in a ProSe direct discovery IE in the discovery message.

Aspect 25: The method of any of Aspects 24-25, wherein the discovery message is a ProSe direct discovery message.

Aspect 26: The method of any of Aspects 24-26, further comprising encrypting the discovery information based at least in part on a set of CSSPs associated with end-to-end ProSe direct discovery.

Aspect 27: The method of any of Aspects 22-27, wherein the discovery message comprises discovery information that includes at least one of an IE associated with service discovery or an IE associated with group member discovery.

Aspect 28: The method of any of Aspects 22-28, wherein the encrypted discovery message comprises an encrypted end-to-end ProSe direct discovery IE, and wherein decrypting the encrypted discovery message comprises decrypting the encrypted ProSe direct discovery IE based at least in part on a set of CRSPs associated with end-to-end ProSe direct discovery.

Aspect 29: The method of Aspect 29, wherein the set of CRSPs associated with the end-to-end ProSe direct discovery that is used to decrypt the encrypted end-to-end ProSe direct discovery IE is different than a set of CRSPs associated with the end-to-end ProSe direct discovery that is to be used by another UE to decrypt encrypted end-to-end ProSe direct discovery IEs.

Aspect 30: The method of any of Aspects 22-30, further comprising: encrypting a response message associated with the relay service based at least in part on a set of CSSPs associated with the relay service; and transmitting the encrypted response message.

Aspect 31: The method of Aspect 31, wherein the response message comprises discovery information that includes at least one of an IE associated with service discovery or an IE associated with group member discovery.

Aspect 32: The method of any of Aspects 31-32, wherein encrypting the response message comprises encrypting an end-to-end ProSe direct discovery IE, included in the response message, based at least in part on a set of CSSPs associated with end-to-end ProSe direct discovery.

Aspect 33: The method of Aspect 33, wherein the set of CSSPs associated with the end-to-end ProSe direct discovery that is used to encrypt the end-to-end ProSe direct discovery IE is different than a set of CSSPs associated with the end-to-end ProSe direct discovery that is to be used by another UE to encrypt end-to-end ProSe direct discovery IEs.

Aspect 34: An apparatus for wireless communication at a device, comprising a processor; memory coupled with the processor; and instructions stored in the memory and executable by the processor to cause the apparatus to perform the method of one or more of Aspects 1-13.

Aspect 35: A device for wireless communication, comprising a memory and one or more processors coupled to the memory, the one or more processors configured to perform the method of one or more of Aspects 1-13.

Aspect 36: An apparatus for wireless communication, comprising at least one means for performing the method of one or more of Aspects 1-13.

Aspect 37: A non-transitory computer-readable medium storing code for wireless communication, the code comprising instructions executable by a processor to perform the method of one or more of Aspects 1-13.

Aspect 38: A non-transitory computer-readable medium storing a set of instructions for wireless communication, the set of instructions comprising one or more instructions that, when executed by one or more processors of a device, cause the device to perform the method of one or more of Aspects 1-13.

Aspect 39: An apparatus for wireless communication at a device, comprising a processor; memory coupled with the processor; and instructions stored in the memory and executable by the processor to cause the apparatus to perform the method of one or more of Aspects 14-20.

Aspect 40: A device for wireless communication, comprising a memory and one or more processors coupled to the memory, the one or more processors configured to perform the method of one or more of Aspects 14-20.

Aspect 41: An apparatus for wireless communication, comprising at least one means for performing the method of one or more of Aspects 14-20.

Aspect 42: A non-transitory computer-readable medium storing code for wireless communication, the code comprising instructions executable by a processor to perform the method of one or more of Aspects 14-20.

Aspect 43: A non-transitory computer-readable medium storing a set of instructions for wireless communication, the set of instructions comprising one or more instructions that, when executed by one or more processors of a device, cause the device to perform the method of one or more of Aspects 14-20.

Aspect 44: An apparatus for wireless communication at a device, comprising a processor; memory coupled with the processor; and instructions stored in the memory and executable by the processor to cause the apparatus to perform the method of one or more of Aspects 21-33.

Aspect 45: A device for wireless communication, comprising a memory and one or more processors coupled to the memory, the one or more processors configured to perform the method of one or more of Aspects 21-33.

Aspect 46: An apparatus for wireless communication, comprising at least one means for performing the method of one or more of Aspects 21-33.

Aspect 47: A non-transitory computer-readable medium storing code for wireless communication, the code comprising instructions executable by a processor to perform the method of one or more of Aspects 21-33.

Aspect 48: A non-transitory computer-readable medium storing a set of instructions for wireless communication, the set of instructions comprising one or more instructions that, when executed by one or more processors of a device, cause the device to perform the method of one or more of Aspects 21-33.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, since those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:

one or more antennas; and a processing system that includes one or more processors and one or more memories that store code and are coupled with the one or more processors, the processing system configured to cause the UE to:

encrypt a discovery message associated with a relay service based at least in part on a set of code-sending security parameters (CSSPs) associated with the relay service, wherein the set of CSSPs includes a first set of security parameters and a second set of security parameters, and wherein the processing system, to encrypt the discovery message based at least in part on the set of CSSPs, is configured to cause the UE to:

encrypt the discovery message using the first set of security parameters to provide end-to-end security of the discovery message, and encrypt the discovery message using the second set of security parameters to provide hop-by-hop security for the discovery message; and transmit the encrypted discovery message.

2. The UE of claim 1, wherein the discovery message comprises an end-to-end proximity services (ProSe) direct discovery information element (IE), and wherein the processing system, to encrypt the discovery message using the first set of security parameters, is configured to cause the UE to:

encrypt the end-to-end ProSe direct discovery IE based at least in part on a set of CSSPs associated with end-to-end ProSe direct discovery.

3. The UE of claim 2, wherein the set of CSSPs associated with the end-to-end ProSe direct discovery that is used to encrypt the end-to-end ProSe direct discovery IE is different than a set of CSSPs associated with the end-to-end ProSe direct discovery that is to be used by another UE to encrypt end-to-end ProSe direct discovery IEs.

4. The UE of claim 1, wherein the discovery message comprises discovery information.

5. The UE of claim 4, wherein the discovery information is included in a proximity services (ProSe) direct discovery information element (IE) in the discovery message.

6. The UE of claim 4, wherein the discovery message is a proximity services (ProSe) direct discovery message.

7. The UE of claim 4, wherein the processing system, to encrypt the discovery message using the first set of parameters, is configured to cause the UE to encrypt the discovery information based at least in part on a set of CSSPs associated with end-to-end proximity services (ProSe) direct discovery.

8. The UE of claim 1, wherein the discovery message comprises discovery information that includes at least one of an information element (IE) associated with service discovery or an IE associated with group member discovery.

9. The UE of claim 1, wherein the processing system is further configured to cause the UE to:

receive an encrypted response message that includes a response message associated with the relay service; and decrypt the encrypted response message based at least in part on a set of code-receiving security parameters (CRSPs) associated with the relay service.

10. The UE of claim 9, wherein the processing system, to cause the UE to decrypt the encrypted response message, is configured to cause the UE to decrypt an encrypted end-to-end proximity services (ProSe) direct discovery information element (IE), included in the response message, based at least in part on a set of CRSPs associated with end-to-end ProSe direct discovery.

11. The UE of claim 10, wherein the set of CRSPs associated with the end-to-end ProSe direct discovery that is used to decrypt the encrypted end-to-end ProSe direct discovery IE is different than a set of CRSPs associated with the end-to-end ProSe direct discovery that is to be used by another UE to decrypt encrypted end-to-end ProSe direct discovery IEs.

12. The UE of claim 9, wherein the processing system is further configured to cause the UE to perform a route discovery procedure associated with the relay service or a route selection procedure associated with the relay service based at least in part on the response message.

13. The UE of claim 9, wherein the response message comprises discovery information that includes at least one of an information element (IE) associated with service discovery or an IE associated with group member discovery.

14. A first user equipment (UE) for wireless communication, comprising:

one or more antennas; and a processing system that includes one or more processors and one or more memories that store code and are coupled with the one or more processors, the processing system configured to cause the first UE to:

receive, from a second UE, an encrypted discovery message;

decrypt, based at least in part on a set of code-receiving security parameters (CRSPs) associated with a relay service, the encrypted discovery message to produce a discovery message;

add information associated with the relay service to the discovery message;

re-encrypt, based at least in part on a set of code-sending security parameters (CSSPs) associated with the relay service after adding the information associated with the relay service to the discovery message, the discovery message to produce a re-encrypted discovery message; and transmit, to a third UE, the re-encrypted discovery message.

15. The UE of claim 14, wherein the discovery message comprises discovery information.

16. The UE of claim 15, wherein the discovery information is included in a proximity services (ProSe) direct discovery information element (IE) in the discovery message.

17. The UE of claim 15, wherein the discovery message is a proximity services (ProSe) direct discovery message.

18. The UE of claim 14, wherein the discovery message comprises discovery information that includes at least one of an information element (IE) associated with service discovery or an IE associated with group member discovery.

19. The UE of claim 14, wherein the processing system is further configured to cause the first UE to:

receive an encrypted response message;

decrypt, based at least in part on the set of CRSPs associated with the relay service, the encrypted response message to produce a response message;

add the information associated with the relay service to the response message;

re-encrypt, based at least in part on the set of CSSPs associated with the relay service after adding the information associated with the relay service to the response message, the response message to produce a re-encrypted response message; and transmit the re-encrypted response message.

20. The UE of claim 19, wherein the response message comprises discovery information that includes at least one of an information element (IE) associated with service discovery or an IE associated with group member discovery.

21. A user equipment (UE) for wireless communication, comprising:

one or more antennas; and a processing system that includes one or more processors and one or more memories that store code and are coupled with the one or more processors, the processing system configured to cause the UE to:

receive an encrypted discovery message, wherein the encrypted discovery message is encrypted based on a first set of security parameters associated with end-to-end security of a discovery message and a second set of security parameters associated with hop-by-hop security for the discovery message; and decrypt the encrypted discovery message based at least in part on a set of code-receiving security parameters (CRSPs) associated with a relay service, wherein the set of CRSPs associated with the relay service enable decryption of an encryption using the second set of security parameters.

22. The UE of claim 21, wherein the processing system is further configured to cause the UE to perform a route discovery procedure associated with the relay service or a route selection procedure associated with the relay service based at least in part on the discovery message.

23. The UE of claim 21, wherein the discovery message comprises discovery information.

24. The UE of claim 23, wherein the discovery information is included in a proximity services (ProSe) direct discovery information element (IE) in the discovery message.

25. The UE of claim 23, wherein the discovery message is a proximity services (ProSe) direct discovery message.

26. The UE of claim 23, wherein the processing system, to decrypt the encrypted discovery message, is configured to cause the UE to decrypt the discovery information based at least in part on a set of CRSPs associated with end-to-end proximity services (ProSe) direct discovery.

27. The UE of claim 21, wherein the discovery message comprises discovery information that includes at least one of an information element (IE) associated with service discovery or an IE associated with group member discovery.

28. The UE of claim 21, wherein the encrypted discovery message comprises an encrypted end-to-end proximity services (ProSe) direct discovery information element (IE), and wherein the processing system, to decrypt the encrypted discovery message, is configured to cause the UE to:

decrypt the encrypted ProSe direct discovery IE based at least in part on a set of CRSPs associated with end-to-end ProSe direct discovery.

29. The UE of claim 21, wherein the processing system is further configured to cause the UE to:

encrypt a response message associated with the relay service based at least in part on a set of code-sending security parameters (CSSPs) associated with the relay service; and transmit the encrypted response message.

30. A method of wireless communication performed by a first user equipment (UE), comprising:

receiving, from a second UE, an encrypted discovery message;

decrypting, based at least in part on a set of code-receiving security parameters (CRSPs) associated with a relay service, the encrypted discovery message to produce a discovery message;

adding information associated with the relay service to the discovery message;

re-encrypting, based at least in part on a set of code-sending security parameters (CSSPs) associated with the relay service after adding the information associated with the relay service to the discovery message, the discovery message to produce a re-encrypted discovery message; and transmitting, to a third UE, the re-encrypted discovery message.

* * * * *